(12) United States Patent
Wang et al.

(10) Patent No.: US 12,356,027 B2
(45) Date of Patent: Jul. 8, 2025

(54) OPTIMAL FORMAT SELECTION FOR VIDEO PLAYERS BASED ON PREDICTED VISUAL QUALITY USING MACHINE LEARNING

(71) Applicant: GOOGLE LLC, Mountain View, CA (US)

(72) Inventors: Yilin Wang, Mountain View, CA (US); Yue Guo, Chapel Hill, NC (US); Balineedu Chowdary Adsumilli, Mountain View, CA (US)

(73) Assignee: Google LLC, Mountain View, CA (US)

( * ) Notice: Subject to any disclaimer, the term of this patent is extended or adjusted under 35 U.S.C. 154(b) by 320 days.

(21) Appl. No.: 17/790,102

(22) PCT Filed: Dec. 31, 2019

(86) PCT No.: PCT/US2019/069055
§ 371 (c)(1),
(2) Date: Jun. 29, 2022

(87) PCT Pub. No.: WO2021/137856
PCT Pub. Date: Jul. 8, 2021

(65) Prior Publication Data
US 2023/0054130 A1  Feb. 23, 2023

(51) Int. Cl.
*H04N 21/23* (2011.01)
*H04N 19/154* (2014.01)
(Continued)

(52) U.S. Cl.
CPC ... *H04N 21/234309* (2013.01); *H04N 19/154* (2014.11); *H04N 19/40* (2014.11)

(58) Field of Classification Search
CPC ................................................ H04N 21/234
(Continued)

(56) References Cited

U.S. PATENT DOCUMENTS 11,483,472 B2 * 10/2022 Bastide ................. G06N 20/00
2010/0104137 A1 * 4/2010 Zhang ................. G06V 20/588
382/104
(Continued)

FOREIGN PATENT DOCUMENTS

CN  108235001 A  6/2018
WO  2016183011 A1  11/2016
(Continued)

OTHER PUBLICATIONS

Narwaria et al., "Machine Learning Based Modeling of Spatial and Temporal Factors for Video Quality Assessment", 2011 18th IEEE International Conference on Image Processing (ICIP), Sep. 11, 2011, pp. 2513-2516.

(Continued)

*Primary Examiner* — Yulin Sun
(74) *Attorney, Agent, or Firm* — Lowenstein Sandler LLP

(57) ABSTRACT

A system and methods are disclosed for optimal format selection for video players based on visual quality. The method includes generating a plurality of reference transcoded versions of a reference video, obtaining quality scores for frames of the plurality of reference transcoded versions of the reference video, generating a first training input comprising a set of color attributes, spatial attributes, and temporal attributes of the frames of the reference video, and generating a first target output for the first training input, wherein the first target output comprises the quality scores for the frames of the plurality of reference transcoded versions of the reference video. The method further includes providing the training data to train a machine learning model on (i) a set of training inputs comprising the first training input and (ii) a set of target outputs comprising the first target output.

20 Claims, 9 Drawing Sheets

(51) Int. Cl.
*H04N 19/40* (2014.01)
*H04N 21/2343* (2011.01)

(58) Field of Classification Search
USPC .................................................. 375/240.01
See application file for complete search history.

(56) References Cited

U.S. PATENT DOCUMENTS

| | | |
|---|---|---|
| 2016/0335754 A1* | 11/2016 | Aaron ................ H04N 21/4666 |
| 2017/0109584 A1 | 4/2017 | Yao et al. |
| 2018/0121733 A1 | 5/2018 | Joshi et al. |
| 2019/0246111 A1 | 8/2019 | Li |
| 2019/0246112 A1 | 8/2019 | Li et al. |
| 2019/0258902 A1 | 8/2019 | Colligan et al. |
| 2019/0295242 A1* | 9/2019 | Bampis ................ G06F 18/214 |

FOREIGN PATENT DOCUMENTS

| | | | | |
|---|---|---|---|---|
| WO | WO-2018111655 A1 * | 6/2018 | ........... | H04N 17/004 |
| WO | 2019117864 A1 | 6/2019 | | |

OTHER PUBLICATIONS

Talebi et al., "Learned Perceptual Image Enhancement", arxiv.org, Cornell University Library, 201 Olin Library Cornell University Ithaca, NY 14853, Dec. 7, 2017, 10 pgs.

PCT International Search Report and Written Opinion for International Application No. PCT/US2019/069055, mailed Aug. 7, 2020, 16 pages.

Office Action for India Patent Application No. 202247041751, dated Nov. 10, 2022, 6 pages.

Office Action for Chinese Patent Application No. 201980103334.2, mailed Jul. 26, 2024, 27 pages.

* cited by examiner

OPTIMAL FORMAT SELECTION FOR VIDEO PLAYERS BASED ON PREDICTED VISUAL QUALITY USING MACHINE LEARNING

TECHNICAL FIELD

Aspects and implementations of the disclosure relate to video processing, and more specifically, to optimal format selection for video players based on predicted visual quality.

BACKGROUND

Content sharing platforms enable users to upload, consume, search for, approve of ("like"), dislike, and/or comment on content such as videos, images, audio clips, news stories, etc. In a content sharing platform, users may upload content (e.g., videos, images, audio clips, etc.) for inclusion in the platform, thereby enabling other users to consume (e.g., view, etc.) the content. Most content sharing platforms transcode an original source video from its native encoded format into a commonly available format. Transcoding comprises decoding the source video from the native format into an unencoded representation using a codec for the native format and then encoding the unencoded representation with a codec for the commonly available format. Transcoding can be used to reduce storage requirements, and also to reduce the bandwidth requirements for serving the video to clients.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the disclosure, a system and methods are disclosed for training a machine learning model (e.g., a neural network, a convolutional neural network (CNN), a support vector machine [SVM], etc.) and using the trained model to process videos. In one implementation, a method includes generating training data for a machine learning model to be trained to identify quality scores for a set of transcoded versions of a new video at a set of display resolutions. The generating the training data may include generating a plurality of reference transcoded versions of a reference video, obtaining quality scores for frames of the plurality of reference transcoded versions of the reference video, generating a first training input comprising a set of color attributes, spatial attributes, and temporal attributes of the frames of the reference video, and generating a first target output for the first training input, wherein the first target output comprises the quality scores for the frames of the plurality of reference transcoded versions of the reference video. The method further includes providing the training data to train the machine learning model on (i) a set of training inputs comprising the first training input and (ii) a set of target outputs comprising the first target output.

In one implementation, the quality scores includes peak signal-to-noise ratio (PSNR) of the frames. In some implementations, the quality scores include video multimethod assessment fusion (VMAF) of the frames. Furthermore, the color attributes may include at least one of an RGB or Y value of the frames. The spatial attributes may include a Gabor feature filter bank. The temporal attributes may include an optical flow.

In some implementations, the machine learning model is configured to process the new video and generate one or more outputs indicating a quality score for the set of transcoded versions of the new video at the set of display resolutions. Furthermore, the plurality of transcoded versions of the reference video may include a transcoding of the reference video at each of a plurality of different video resolutions, transcoding configurations, and the different display resolutions.

Further, computing devices for performing the operations of the above described methods and the various implementations described herein are disclosed. Computer-readable media that store instructions for performing operations associated with the above described methods and the various implementations described herein are also disclosed.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
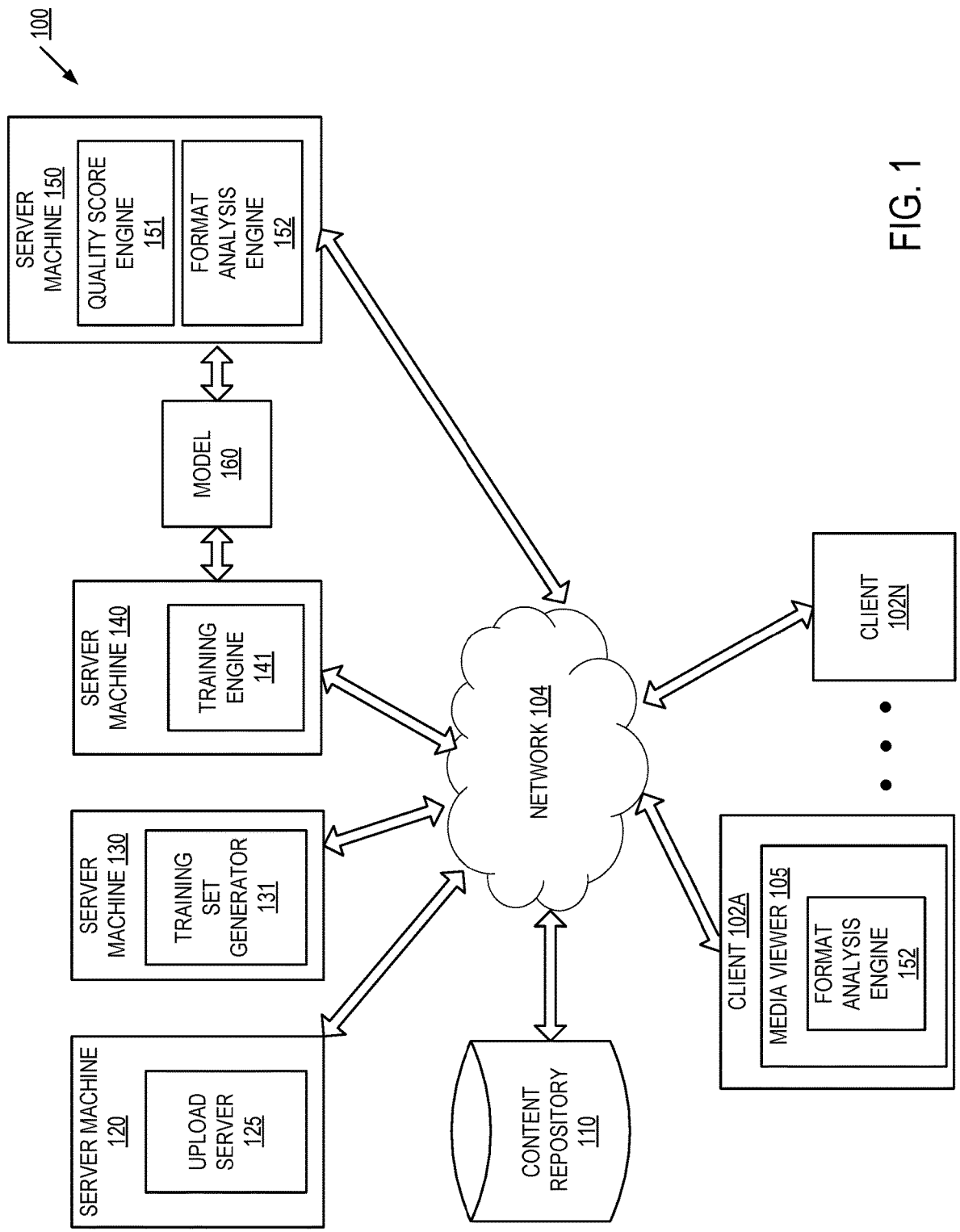
FIG. 1 depicts an illustrative computer system architecture, in accordance with one or more aspects of the disclosure.

In a content sharing platform, users may upload content (e.g., videos, images, audio clips, etc.) for inclusion in the platform, thereby enabling other users to consume (e.g., view, etc.) the content. Due to the restrictions of viewing devices and network bandwidth, videos uploaded to the content sharing platforms are transcoded (uncompressed and re-compressed) before serving to viewers in order to enhance the viewing experience. An uploaded video may have multiple transcoded variants being played at various display resolutions. Resolutions (input, transcoded, and display) can be roughly grouped to canonical industry standard resolutions, such as 360p, 480p, 720p, 1080p, 2160p (4k), and so on.

A typical transcoding pipeline can generate multiple transcoded versions (also called video formats). When playing a video, a media viewer can adaptively select one of those video formats to serve. A conventional serving strategy, assuming users have enough bandwidth, is to switch to a higher resolution version of a video until reaching the highest available resolution. This is also known as an Adaptive Bit Rate (ABR) strategy. The assumption of such ABR strategy is that higher resolution versions provide a better visual quality. However, in some cases, the visual quality of the higher resolution version can be very close to the visual quality of the lower resolution version (e.g., when a 480p version of a video has a similar perceptual quality as a 720p version of the video when played back on client device having a 480p display resolution). In such a case, serving the higher resolution version of the video wastes the user's bandwidth without providing a discernible benefit to the user in terms of perceptual quality.

One approach to avoid such inefficiencies due to suboptimal format selection is to attach a list of objective quality scores with each transcoded version, with the underlying assumption that each objective quality score reflects the perceptual quality when playing a particular format at a certain display resolution. Computing a single quality score for a particular format of a video entails decoding two video streams (i.e., a rescaled transcoded version and the original version), and extracting per frame features in order to calculate the overall quality score. If it is assumed there are 'N_format' valid transcoded video formats, 'N_transconfig' candidate transcoding configurations for transcoding the input video to a certain video format, and 'N_display' kinds of possible display resolutions, then the total number of possible quality scores to compute would be: 'N_format' x 'N_transconfig' x 'N_display' scores. Computing all possible quality scores across the various resolutions utilizes a large amount of computational resources. Furthermore, it may be infeasible to perform such sizable computations on large scale systems (e.g. content sharing platforms having millions of new uploads every day).

Disclosed herein are aspects and implementations of a system and methods to efficiently predict all possible video quality scores for video based on deep learning. More particularly, implementations involve training and using an efficient machine learning model to predict objective quality scores for videos compressed with arbitrary compression settings and played on arbitrary display resolutions.

In accordance with one implementation, a set of historical videos is accessed and used to train a machine learning model. In particular, each of the historical videos is used to generate input features to train the machine learning model. The input features include a set of attributes of the frames of a respective historical video. The set of attributes can include color attributes (e.g., red/green/blue (RGB) intensity values or Y intensity values of the YUV format), spatial attributes (e.g., Gabor filter), and temporal attributes (e.g., optical flow) of the frame(s) of the respective historical video. In addition, each of the historical videos is transcoded into a plurality of different resolution formats and transcoding configurations to generate a plurality of transcoded versions of the video. The plurality of transcoded versions are then rescaled into a plurality of different potential display resolutions of client devices (referred to herein as rescaled transcoded versions). A quality score (e.g., peak signal-to-noise ratio (PSNR) measurement or video multimethod assessment fusion (VMAF measurement) is obtained for each of the rescaled transcoded versions.

These quality scores may then be used as training outputs (e.g., ground truth labels), which are mapped to the training input features discussed above and used to train the machine learning model. In this way, the machine learning model is trained to generate a predicted quality score for the video at each possible tuple of video resolution format, transcoding configuration, and display resolution. As used herein, the terms "video resolution format" and "video format" may refer to the resolution of a video prior to rescaling. The term "display resolution" may refer to the resolution at which the video is actually displayed (e.g., by a media viewer on a client device), after rescaling.

After the machine learning model has been trained, a new video may be identified for processing by the trained machine learning model. In this case, the perceptual quality of a constituent video (e.g., the video provided for playback to a client device) at a variety of video resolutions and transcoding configurations at various display resolutions is not known because the new video is provided in its entirety to the machine learning model, without any knowledge of how the perceptual quality of the video may be at a particular client device.

In one implementation, a set of attributes (e.g., color, spatial, temporal) of the new video are determined. The set of attributes of the new video is presented as input to the trained machine learning model, which generates one or more outputs based on the input. In one implementation, the outputs are predicted quality scores providing a predicted perceptual quality measurement of the video at each possible tuple of video resolution, transcoding configuration, and display resolution. In some implementations, the predicted quality scores may be utilized to optimize format selection at the client device. Particular aspects concerning the training and usage of the machine learning model are described in greater detail below.

Aspects of the disclosure thus provide a mechanism by which predicted quality scores for a video at all possible combinations of video resolution, transcoding configuration, and display resolution can be identified. This mechanism allows automated and optimized format selection for playback of a video at a client device having a particular display resolution. An advantage of implementations of the disclosure is that the trained machine learning model is able to return multiple objective video quality scores (e.g., PSNR and VMAF values) for all (video_format, transcoding_config, display_resolution) tuples of an input video at once. Implementations avoid the time-consuming processes of transcoding or quality metric computation for each possible transcoded version of an input video. The output of the trained machine learning model can be utilized to optimize format selection to maximize user experience of video quality. Optimizing format selection may also have the advantage of reducing bandwidth requirements, without noticeably reducing the video quality perceived by a user.

FIG. 1 illustrates an illustrative system architecture 100, in accordance with one implementation of the disclosure. The system architecture 100 includes one or more server machines 120 through 150, a content repository 110, and client machines 102A-102N connected to a network 104. Network 104 may be a public network (e.g., the Internet), a private network (e.g., a local area network (LAN) or wide area network (WAN)), or a combination thereof.

The client machines 102A-102N may be personal computers (PCs), laptops, mobile phones, tablet computers, set top boxes, televisions, video game consoles, digital assistants or any other computing devices. The client machines 102A-102N may run an operating system (OS) that manages hardware and software of the client machines 102A-102N. In one implementation, the client machines 102A-102N may upload videos to the web server (e.g., upload server 125) for storage and/or processing.

Server machines 120 through 150 may be a rackmount server, a router computer, a personal computer, a portable digital assistant, a mobile phone, a laptop computer, a tablet computer, a camera, a video camera, a netbook, a desktop computer, a media center, or any combination of the above. Server machine 120 includes an upload server 125 that is capable of receiving content (e.g., videos, audio clips, images, etc.) uploaded by client machines 102A-102N (e.g., via a webpage, via an application, etc.).

Content repository 110 is a persistent storage that is capable of storing content items as well as data structures to tag, organize, and index the media items. Content repository 110 may be hosted by one or more storage devices, such as main memory, magnetic or optical storage based disks, tapes or hard drives, NAS, SAN, and so forth. In some implementations, content repository 110 may be a network-attached file server, while in other embodiments content repository 110 may be some other type of persistent storage such as an object-oriented database, a relational database, and so forth, that may be hosted by the server machine 120 or one or more different machines coupled to the server machine 120 via the network 104.

The content items stored in the content repository 110 may include user-generated media items that are uploaded by client machines, as well as media items from service providers such as news organizations, publishers, libraries and so forth. In some implementations, content repository 110 may be provided by a third-party service, while in some other implementations content repository 110 may be maintained by the same entity maintaining server machine 120. In some examples, content repository 110 and server machine 120-150 may be part of a content sharing platform that allows users to upload, consume, search for, approve of ("like"), dislike, and/or comment on media items.

The content sharing platform may include multiple channels. A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Each channel may include one or more media items. Examples of media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media items are also referred to as a video content item.

Media items may be consumed via media viewers 105 executing on client machines 102A-102N. In one implementation, the media viewers 105 may be applications that allow users to view content, such as images, videos (e.g., video content items), web pages, documents, etc. For example, the media viewers 105 may be a web browser that can access, retrieve, present, and/or navigate content (e.g., web pages such as Hyper Text Markup Language (HTML) pages, digital media items or content items, etc.) served by a web server. The media viewers 105 may render, display, and/or present the content (e.g., a web page, a media viewer) to a user. The media viewers 105 may also display an embedded media player (e.g., a Flash® player or an HTML5 player) that is embedded in a web page (e.g., a web page that may provide information about a product sold by an online merchant). In another example, the media viewers 105 may be a standalone application (e.g., a mobile application) that allows users to view digital media content items (e.g., digital videos, digital images, electronic books, etc.).

The media viewers 105 may be provided to the client devices 102A through 102N by the server 120 and/or content sharing platform. For example, the media viewers 105 may be embedded media players that are embedded in web pages provided by the content sharing platform. In another example, the media viewers may be applications that communicate with the server 120 and/or the content sharing platform.

Implementations of the disclosure provide for training and using an efficient machine learning model to predict objective quality for videos compressed with arbitrary compression settings and played on arbitrary display resolutions. Server machine 130 includes a training set generator 131 that is capable of generating training data (e.g., a set of training inputs and target outputs) to train such a machine learning model. Some operations of training set generator 131 are described in detail below with respect to FIG. 2.

Server machine 140 includes a training engine 141 that is capable of training a machine learning model 160. The machine learning model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns. The machine learning model may be composed of, e.g., a single level of linear or non-linear operations (e.g., a support vector machine [SVM] or may be a deep network, i.e., a machine learning model that is composed of multiple levels of non-linear operations). An example of a deep network is a neural network with one or more hidden layers, and such machine learning model may be trained by, for example, adjusting weights of a neural network in accordance with a backpropagation learning algorithm or the like. For convenience, the remainder of this disclosure refers to the implementation as a neural network, even though some implementations might employ an SVM or other type of learning machine instead of, or in addition to, a neural network. In one implementation, a convolutional neural network (CNN), such as ResNet or EfficientNet, are used as the primary training model for the machine learning model. Other machine learning models may be considered in implementations of the disclosure. In one aspect, the training set is obtained from server machine 130.

Server machine 150 includes a quality score engine 151 and a format analysis engine 152. The quality score engine 151 is capable of providing attribute data of frames of a video as input to trained machine learning model 160 and running trained machine learning model 160 on the input to obtain one or more outputs. As described in detail below with respect to FIG. 4, in one implementation format analysis engine 152 is also capable of extracting quality score data from the output of the trained machine learning model 160 and using the quality score data to perform optimal format selection for the video. In some implementations, format analysis engine 152 may be provided by media viewers 105 at client devices 102A-102N based on the quality score data obtained by quality score engine 151.

It should be noted that in some other implementations, the functions of server machines 120, 130, 140, and 150 may be provided by fewer machines. For example, in some implementations, server machines 130 and 140 may be integrated into a single machine, while in other implementations server machines 130, 140, and 150 may be integrated into a single machine. In addition, in some implementations one or more of server machines 120, 130, 140, and 150 may be integrated into the content sharing platform.

In general, functions described in one implementation as being performed by the content item sharing platform, server machine 120, server machine 130, server machine 140, and/or server machine 150 can also be performed on the client devices 102A through 102N in other implementations, if appropriate. In addition, the functionality attributed to a particular component can be performed by different or multiple components operating together. The content sharing platform, server machine 120, server machine 130, server machine 140, and/or server machine 150 can also be accessed as a service provided to other systems or devices through appropriate application programming interfaces, and thus is not limited to use in websites.

Figure 2:
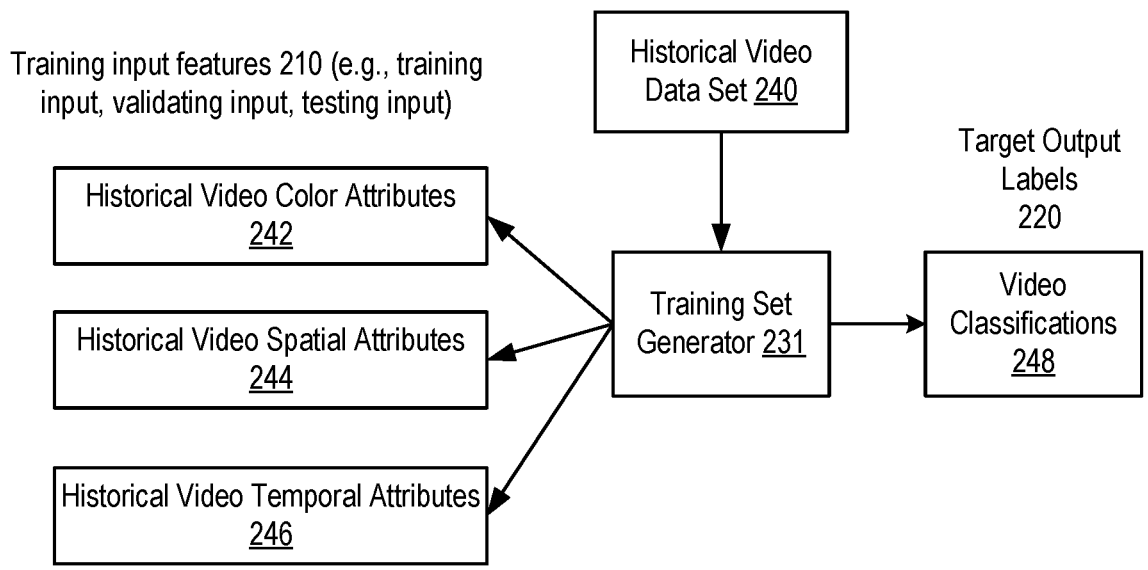
FIG. 2 is a block diagram of an example training set generator to create data sets for a machine learning model using a historical video data set, in accordance with one or more aspects of the disclosure.

FIG. 2 is an example training set generator 231 (e.g., training set generator 131 of FIG. 1) to create data sets for a machine learning model (e.g., model 160 of FIG. 1) using historical video data set 240, according to certain embodiments. System 200 of FIG. 2 shows training set generator 231, training input features 210, and target output labels 220.

In some embodiments, training set generator 231 generates a data set (e.g., training set, validating set, testing set) that includes one or more training input features 210 (e.g., training input, validating input, testing input) and one or more target output labels 220 that correspond to the training input features 210. The data set may also include mapping data that maps the training input features 210 to the target output labels 220. Training input features 210 may also be referred to as "data input," "features," "attributes," or "information." In some embodiments, training set generator 131 may provide the data set to the training engine 141 of FIG. 1, where the data set is used to train, validate, or test the machine learning model 160. Some embodiments of generating a training set may further be described with respect to FIG. 4.

In some embodiments, training input features 210 may include one or more of historical video color attributes 242, historical video spatial attributes 244, historical video temporal attributes 246, etc. Target output labels 220 may include video classifications 248. The video classifications 248 may include or be associated with video quality score measurement algorithms.

In some embodiments, training set generator 231 may generate data input corresponding to the set of features (e.g., one or more historical video color attributes 242, historical video spatial attributes 244, historical video temporal attributes 246) to train, validate, or test a machine learning model for each input resolution of a set of possible input resolutions of videos. As such, each typical resolution of a video (e.g. 360p, 480p, 720p, 1080p, etc.) may have its own model, and any non-standard arbitrary input resolutions (for instance 1922×1084) can be rescaled to the closest standard resolution with the same aspect ratio, with any missing part padded with 0. For example, a first machine learning model may be trained, validated, and tested for input videos having 360p resolution. A second machine learning model may be trained, validated, and tested for input videos having 480p resolution. A third machine learning model may be trained, validated, and tested for input videos having 720p resolution, and so on.

Training set generator 231 may utilize a set of historical videos 240 to train, validate, and test the machine learning model(s). In some implementations, an existing data set of the content sharing platform may be curated and utilized as historical video data set 240 specifically for the purposes of training, validating, and testing machine learning models. In one implementation, historical video data set 240 may include multiple (e.g., in the order of the thousands) videos of short duration (e.g., 20 second, etc.) in various input resolutions (e.g., 360p, 480p, 720p, 1080p, 2160p (4K), and so on). In some implementations, the data (e.g., videos) in the historical video data set 240 may be divided into training data and testing data. For example, the videos of historical video data set 240 may be randomly split into 80% and 20% for training and testing, respectively.

To generate a set of training input features 210 and training output labels 220, the training set generator 231 may iterate through the following process on each of the videos in the historical video data set 240. For ease of reference, the process is described with respect to a first reference video of the historical video data set 240. It should be understood that a similar process may be performed by training set generator 231 on all videos in the historical video data set 240.

With respect to the first reference video, the training set generator 231 obtains the training input features 210 of the first reference video. In one implementation, for each frame of the first reference video, a set of video color attributes 242, video spatial attributes 244, and video temporal attributes 246 are extracted for each frame of the first reference video. The video color attribute 242 may refer to at least one of RGB intensity values or Y intensity values (of the Y'UV model) of the pixels of the frame.

The video spatial attributes 244 may refer to a Gabor filter feature bank. A Gabor filter is a linear filter used for texture analysis, which analyzes whether there are any specific frequency content in the frame in specific directions in a localized region around a point or region of analysis. In the spatial domain, a 2D Gabor filter is a Gaussian kernel function modulated by a sinusoidal plane wave. Implementations of the disclosure may also utilize other spatial features of the frame, such as block-based features (e.g., SSM, VMS, etc.).

The video temporal attributes 246 may refer to optical flow. Optical flow refers to the pattern of apparent motion of objects, surfaces, and edges in a visual scene caused by the relative motion between an observer and the scene. Optical flow may be defined as the distribution of apparent velocities of movement of brightness pattern in an image. Implementations of the disclosure may also utilize other temporal features of the frame, such as computing a difference between pixels of neighboring frames.

The extracted set of historical video color attributes 242, historical video spatial attributes 244, and historical video temporal attributes 246 for each frame in the first reference video are then combined as a first set of training input features for the first reference video. Other sets of features from the frames of the input video may also be considered in implementations of the disclosure.

To obtain the target output labels 220 for the first reference video, the training set generator 231 may transcode the first reference video into a plurality of valid video formats (e.g., 360p, 480p, 720p, 1080p, 21260p (4K), and so on), with a plurality of transcoding configurations (e.g. sweeping Constant Rate Factor (CRF) from 0 to 51 with an H.264 encoder). Other codecs and encoders could be used in other implementations of the disclosure, such as the VP9 codec. The training set generator 231 then rescales all of the transcoded versions to a plurality of display resolutions (e.g., 360p, 480p, 720p, 1080p, 2160p (4K), and so on), as well as the input original version. Each rescaled transcoded version and the original version are provided to a quality analyzer as source and reference to obtain quality scores for each frame of each rescaled transcoded version and the original version of the first reference video.

In one implementation, the quality score may be a PSNR measurement for each frame of each rescaled transcoded version and the original version of the first reference video. PSNR refers to the ratio between the maximum possible power of a signal and the power of corrupting noise that affects the fidelity of its representation. PSNR may be expressed in terms of the logarithmic decibel scale. In one implementation, the quality score may be a VMAF measurement for each frame of each rescaled transcoded version and the original version of the first reference video. VMAF refers to a full-reference video quality metric that predicts subject video quality based on a reference and distorted video sequence.

The computed quality scores are used as video classification (e.g., input ground-truth labels) 248 for the target output labels 220 for each possible video format, transcoding configuration, and display resolution of the first reference video.

Figure 3:
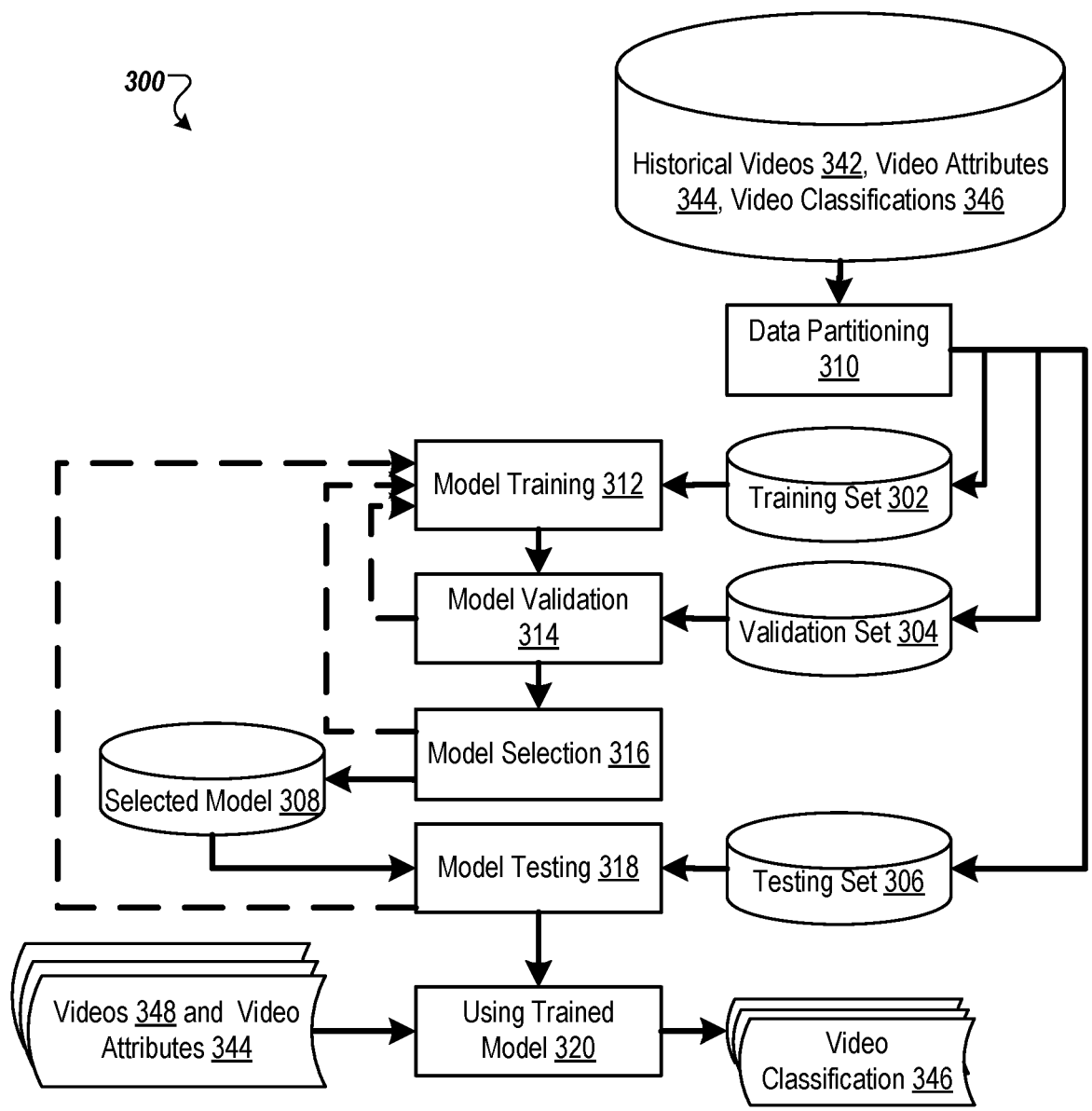
FIG. 3 is a block diagram illustrating a system for determining video classifications, in accordance with one or more aspects of the disclosure.

FIG. 3 is a block diagram illustrating a system 300 for determining video classifications 346, according to certain embodiments. At block 310, the system 300 performs data partitioning (e.g., via training set generator 131 of server machine 130 of FIG. 1 and/or training set generator 231 of FIG. 2) of the historical videos 342 (e.g., historical video data set 240 of FIG. 2) to generate the training set 302, validation set 304, and testing set 306. For example, the training set may be 60% of the historical videos 342, the validation set may be 20% of the historical videos 342, and the validation set may be 20% of the historical videos 342. As discussed above with respect to FIG. 2, the system 300 may generate a plurality of sets of features (e.g., color attributes, spatial attributes, temporal attributes) for each of the training set, the validation set, and the testing set.

At block 312, the system 300 performs model training (e.g., via training engine 141 of FIG. 1) using the training set 302. The system 300 may train multiple models using multiple sets of features of the training set 302 (e.g., a first set of features of the training set 302, a second set of features of the training set 302, etc.). For example, system 300 may train a machine learning model to generate a first trained machine learning model using the first set of features in the training set (e.g., for a first input resolution, such as 360p) and to generate a second trained machine learning model using the second set of features in the training set (e.g., for a second input resolution, such as 480p). In some embodiments, numerous models may be generated including models with various permutations of features and combinations of models.

In some implementation, a Convolutional Neural Network (CNN) training model is utilized to perform model training. Some examples of CNN training models include ResNet and EfficientNet. In some implementations, other training models could also be utilized.

At block 314, the system 300 performs model validation using the validation set 304. The system 300 may validate each of the trained models using a corresponding set of features of the validation set 304. For example, system 300 may validate the first trained machine learning model using the first set of features in the validation set (e.g., for 360p input resolution) and the second trained machine learning model using the second set of features in the validation set (e.g., for 480p input resolution). In some embodiments, the system 300 may validate numerous models (e.g., models with various permutations of features, combinations of models, etc.) generated at block 312.

At block 314, the system 300 may determine an accuracy of each of the one or more trained models (e.g., via model validation) and may determine whether one or more of the trained models has an accuracy that meets a threshold accuracy. For example, a loss function may be utilized that is defined based on absolute difference between predicted quality and ground truth. Higher order $\|L\|$ norms of differences could be considered in other implementations, as well. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 performs model selection to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, the system 300 performs model testing using the testing set 306 to test the selected model 308. The system 300 may test, using the first set of features in the testing set, the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and not applicable to other data sets such as the testing set 306), flow continues to block 312 where the system 300 performs model training (e.g., retraining) using different training sets corresponding to different sets of features. Responsive to determining that the selected model 308 has an accuracy that meets a threshold accuracy based on the testing set 306, flow continues to block 320. In at least block 312, the model may learn patterns in the historical images 342 to make predictions and in block 318, the system 300 may apply the model on the remaining data (e.g., testing set 306) to test the predictions.

At block 320, system 300 uses the trained model (e.g., selected model 308) to receive input videos 348 and corresponding video attributes 344 and extracts, from the output of the trained model, a corresponding video classification 346, representing a predicted quality score of the input video at each possible combination of the video format, transcoding configuration, and display resolution tuple. For a single input video, the trained model may be used to predict per frame quality scores for each sampled frame, then those frame scores may be aggregated to get the overall score for the input video at the particular video format, transcoding configuration, and display resolution tuple. In other incarnations, the aggregation method could also be varied, i.e., mean to weighted mean, etc.

Figure 8A:
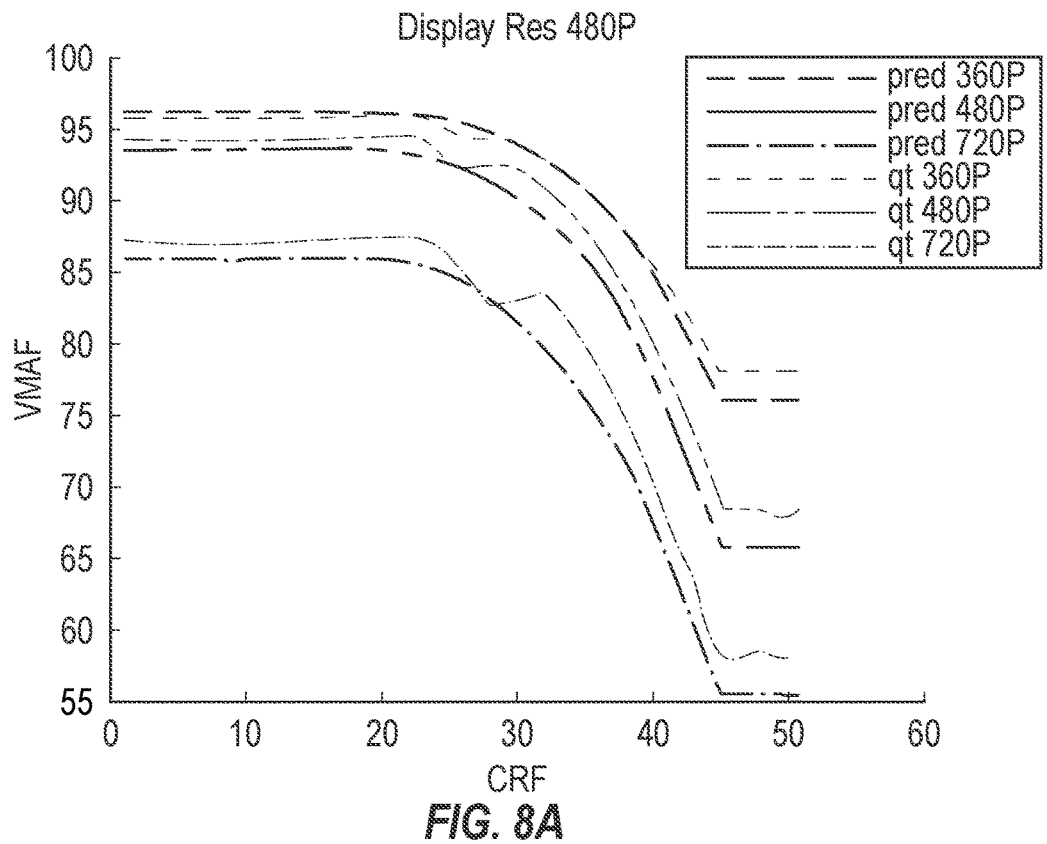
FIGS. 8A and 8B provide an example graphical representation of output of a trained machine learning model to optimize format selection, according to implementations of the disclosure.
Figure 8B:
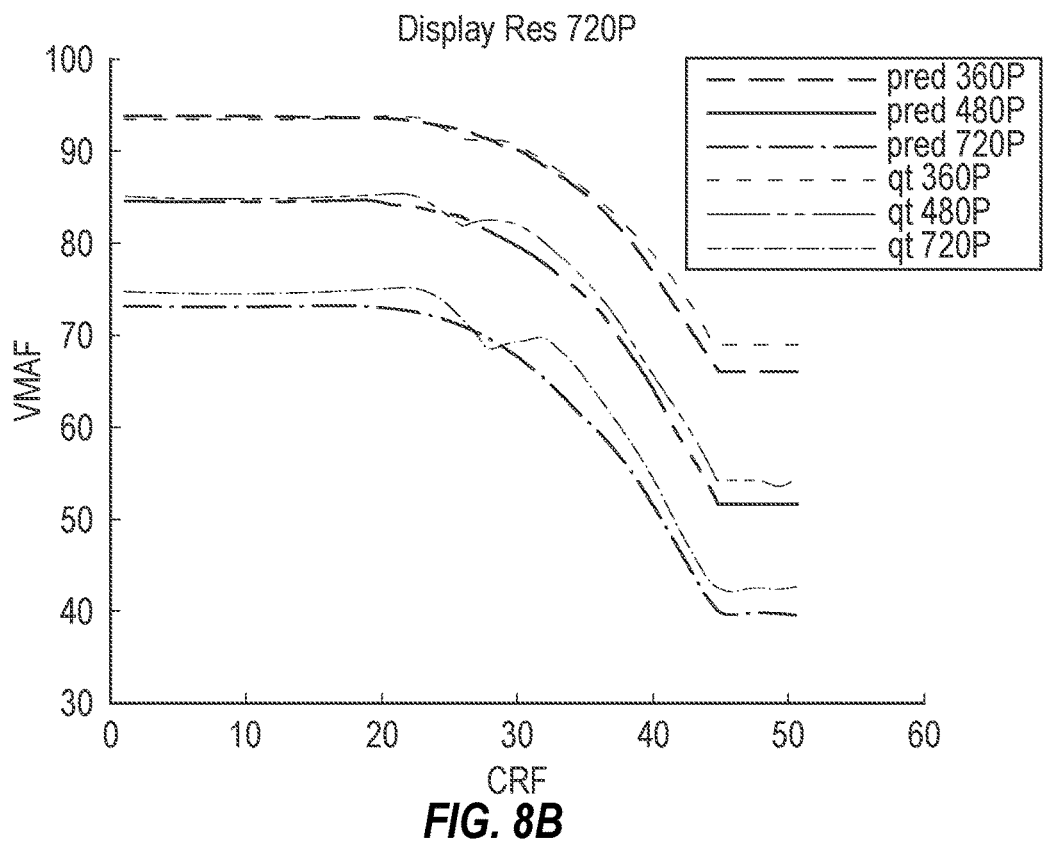

The final output is a 3D quality matrix for all possible index tuples (video_format_index, transcoding_config_index, display_resolution_index). One example graphical representation of output of the trained model of implementations of the disclosure is shown in FIGS. 8A and 8B. FIGS. 8A and 8B, discussed further below, show predicted VMAF scores for a video transcoded into 360p, 480p, and 720p versions, and displayed at 480p and 720p, where the various scores predicted by the trained model are very close to the corresponding ground truth scores.

In some embodiments, subsequent to generating a data set and training, validating, or testing machine learning model 160 using the data set, the machine learning model 160 may be further trained, validated, tested (e.g., using manually determined image classifications, etc.), or adjusted (e.g., adjusting weights associated with input data of the machine learning model 160, such as connection weights in a neural network).

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

For performance and latency improvements during implementations of the disclosure, the trained model may be combined with temporal sampling of the input video. For example, the system may utilize a few sampled frames (rather than all frames) of the input video as input to the trained model to predict the overall quality. Using such temporal sampling of the input video, significant speed improvements may be realized with little to no loss in accuracy. These speed gains can be obtained without any re-training of the model.

In implementations of the disclosure, the video classifications 346 obtained from using the trained model 320 may be used to optimize format selection on the client side (e.g., at a media viewer such as media viewer 105 of FIG. 1). For the example shown in FIG. 8A, when the display resolution is 480p, and current version being played is 360p, assuming the bandwidth is sufficient, for all transcoded versions. Per predicted quality scores, the perceptual quality of the 480p and 720p versions are very close, and both of them are significantly higher than the 360p version. In this case, the optimal format is the 480p transcoded version, instead of 720p.

In absence of the current proposed algorithms which provides predicted scores, the media viewer may blindly move to the 720p version, which utilizes more bandwidth but would not improve the actual watching experience (e.g., perceptual quality as measured by, for example, PSNR or VMAF). When the display resolution is 720p (FIG. 8B), since the difference between 480p and 720p is greater than 6 points on VMAF (which roughly translates to 1 step higher in the noticeable differences), moving up to 720p improves the actual perceptual quality.

Another advantage of implementations of the disclosure is that it allows precise quality evaluation (e.g., at the CRF level). For example, the media viewer can calculate the exact quality improvement on 480p display resolution for switching from 480p CRF 40 version to 720p CRF 30 version, to further optimize the format selection.

Figure 4:
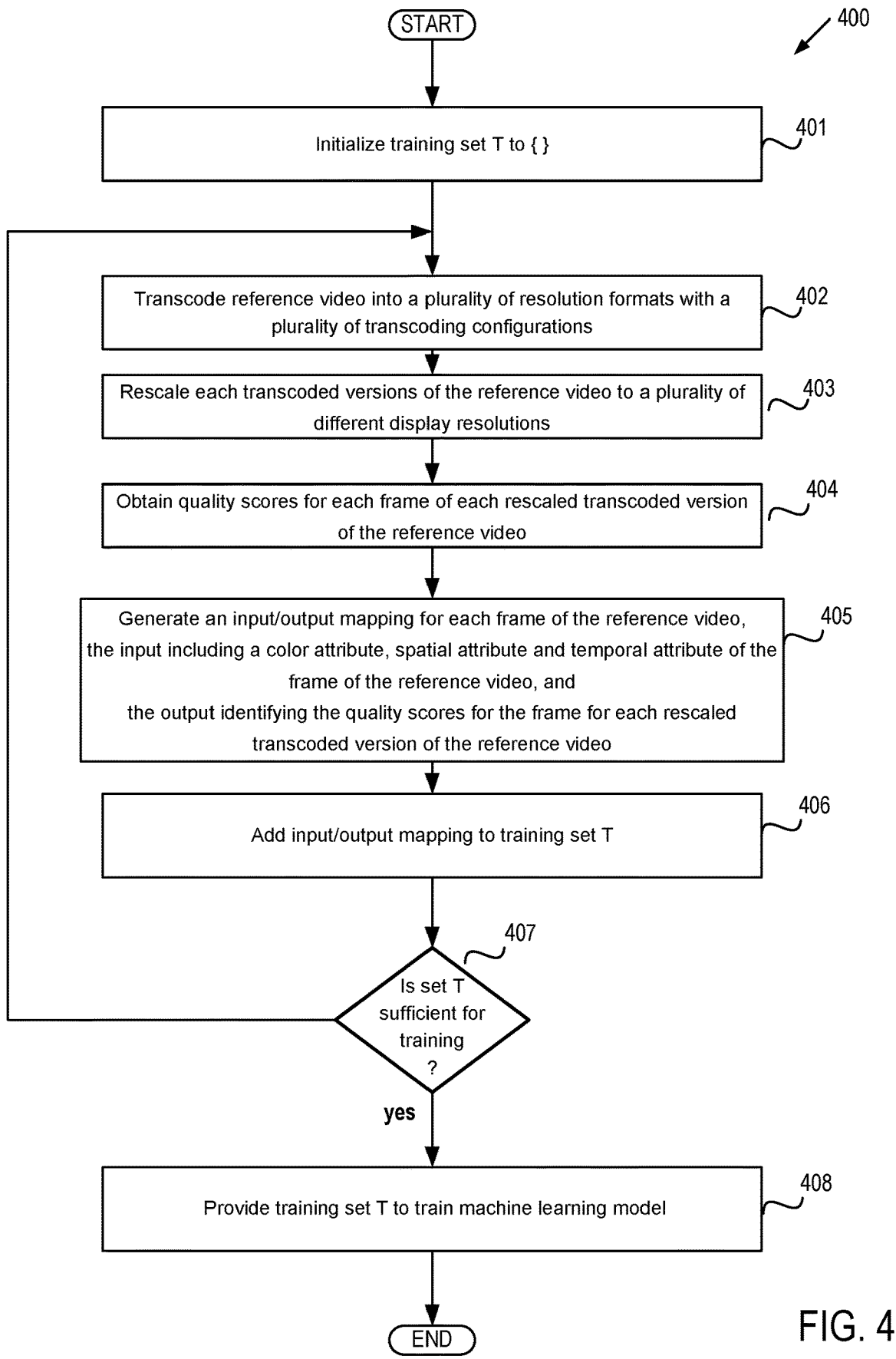
FIG. 4 depicts a flow diagram of one example of a method for training a machine learning model, in accordance with one or more aspects of the disclosure.

FIG. 4 depicts a flow diagram of one example of a method 400 for training a machine learning model, in accordance with one or more aspects of the disclosure. The method is performed by processing logic that may comprise hardware (circuitry, dedicated logic, etc.), software (such as is run on a general purpose computer system or a dedicated machine), or a combination thereof. In one implementation, the method is performed by computer system 100 of FIG. 1, while in some other implementations, one or more blocks of FIG. 4 may be performed by one or more other machines not depicted in the figures. In some aspects, one or more blocks of FIG. 4 may be performed by training set generator 131 of server machine 130 of FIG. 1 and/or training set generator 231 of FIG. 2.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Method 400 begins with generating training data for a machine learning model. In some implementations, at block 401, a training set T is initialized to an empty set. At block 402, a reference video is transcoded into a plurality of resolution formats with a plurality of transcoding configurations. In one implementation, the plurality of resolution formats comprise 360p, 480, 720p, 1080p, 2160p (4K), and so on. The plurality of transcoding configurations may include CRF from 0 to 51 with an H.264 encoder. Other codecs and encoders could be used in implementations of the disclosure for the transcoding configurations, such as the VP9 codec. In one example, the reference video may be a video having 480p resolution, that is transcoded into each resolution format of 360p, 480p, 720p, 1080p, and 2160p, at each transcoding configuration of the H.264 encoder of CRF 0 to 51. For example, the 480p reference video can be transcoded into a 720p CRF 0 version through a 720p CRF 51 version, and so on, for all resolution formats and transcoding configurations, resulting in a plurality of different transcoded versions of the reference video.

At block 403, each transcoded version of the reference video generated at block 402 is rescaled to a plurality of different display resolutions. In one implementation, the plurality of different display resolutions represent the possible display resolutions of client devices playing back the transcoded versions of the reference video. The plurality of different display resolutions may include 360p, 480p, 720p, 1080p, 2160p, and so on. Referring to the example above, taking a 720p CRF 30 version of the 480p reference video as a further example, the 720p CRF 30 version can be rescaled to each display resolution of 360p, 480p, 720p, 1080p, and 2160p to generate rescaled transcoded versions of the 480p reference video. This rescaling is performed for each transcoded version of the reference video generated at block 402 to generate a plurality of rescaled transcoded versions of the reference video.

At block 404, quality scores for each frame of each rescaled transcoded version of the reference video are obtained. In one implementation, the quality scores may be a PSNR score or a VMAF score determined for the frames of the rescaled transcoded versions of the reference video. PSNR refers to the ratio between the maximum possible power of a signal and the power of corrupting noise that affects the fidelity of its representation. PSNR may be expressed in terms of the logarithmic decibel scale. VMAF refers to a full-reference video quality metric that predicts subject video quality based on a reference and distorted video sequence.

At block 405, an input/output mapping is generated for each frame of the reference video. The input/output mapping refers to the training input mapped to particular target outputs. The training input includes or is based on a set of attributes of the reference video. The target output for the training input identifies the quality scores for the frames of the rescaled transcoded versions of the reference video. The training input is associated with (or mapped to) the target output. In one implementation, the set of attributes of the reference video includes color attributes (e.g., RGB intensity values or Y intensity values of each frame), spatial attributes (e.g., Gabor filter feature of each frame), and temporal attributes (e.g., optical flow of each frame). In one implementation, the set of attributes of each frame of the reference video is mapped as input to the quality scores of each frame of each rescaled transcoded version of the reference video. At block 406, the input/output mapping generated at block 405 is added to training set T.

Block 407 branches based on whether training set T is sufficient for training machine learning model 160. If so, execution proceeds to block 408, otherwise, execution continues back at block 402. It should be noted that in some implementations, the sufficiency of training set T may be determined based on the number of input/output mappings in the training set, while in some other implementations, the sufficiency of training set T may be determined based on one or more other criteria (e.g., a measure of diversity of the training examples, etc.) in addition to, or instead of, the number of input/output mappings.

At block 408, training set T is provided to train machine learning model 160. In one implementation, training set T is provided to training engine 141 of server machine 140 to perform the training. In the case of a neural network (e.g., CNN), for example, input values of a given input/output mapping (e.g., pixel values of a training image, etc.) are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in training set T. After block 408, machine learning model 160 can then be used to process videos (for example, in accordance with method 500 of FIG. 5, described below).

Figure 5:
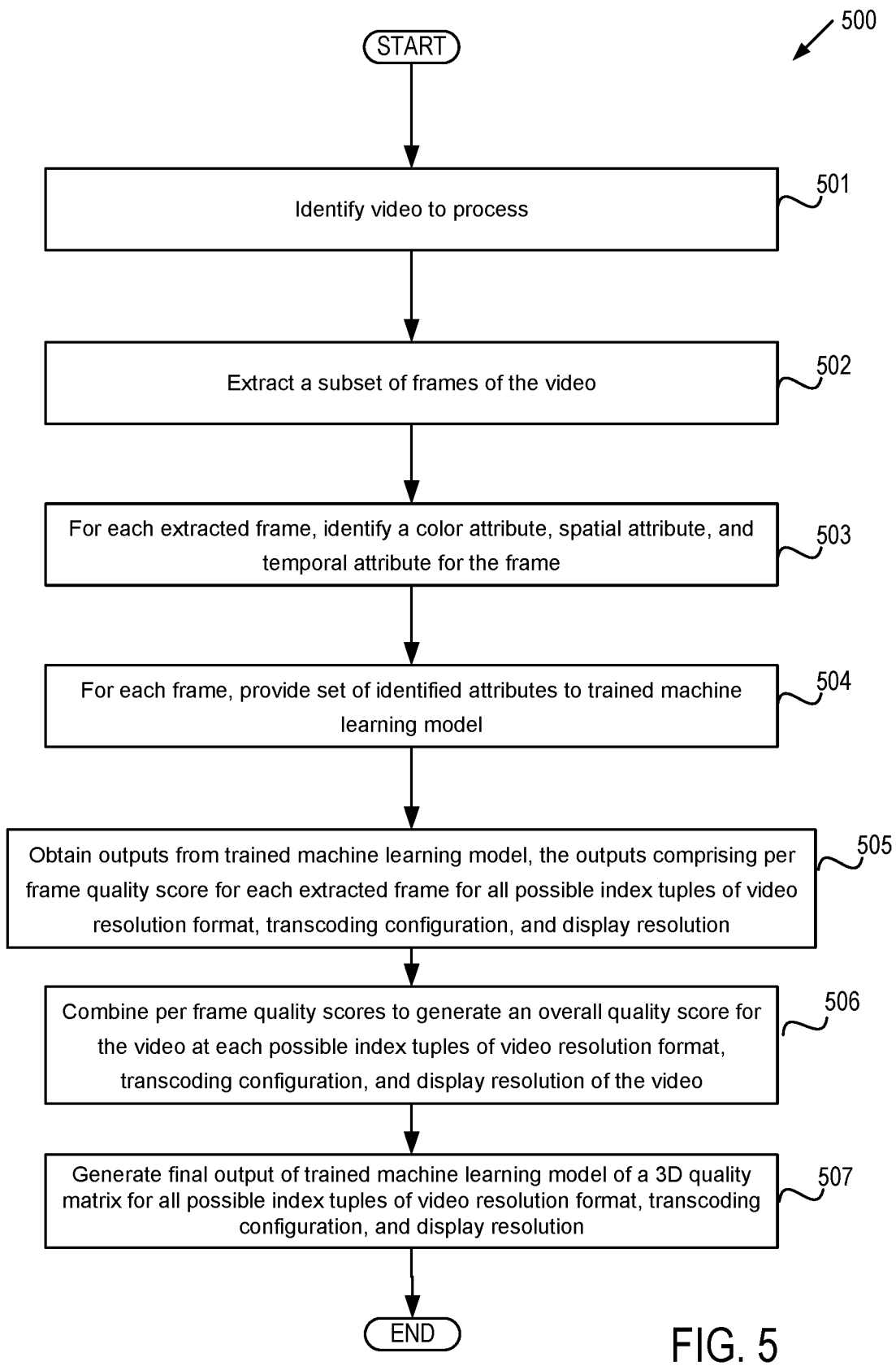
FIG. 5 depicts a flow diagram of one example of a method for processing videos using a trained machine learning model, in accordance with one or more aspects of the disclosure.

FIG. 5 depicts a flow diagram of one example of a method 500 for processing videos using a trained machine learning model, in accordance with one or more aspects of the disclosure. The method is performed by processing logic that may comprise hardware (circuitry, dedicated logic, etc.), software (such as is run on a general purpose computer system or a dedicated machine), or a combination thereof. In one implementation, the method is performed using the server machine 150 and trained machine learning model 160 of FIG. 1, while in some other implementations, one or more blocks of FIG. 5 may be performed by one or more other machines not depicted in the figures.

Method 500 may include receiving an input video (e.g., from a user device or a server such as upload server 125) and processing the input video using a trained model such as trained machine learning model 160. The trained model may be configured to generate, based on pixel data of frames of the input video, one or more outputs indicating a predicted quality score of the input video.

In some implementations, at block 501, a video (input video) may be identified for processing. In one example, the video includes one or more frames of an uploaded video (e.g., a video uploaded to a content sharing platform).

At block 502, a subset of frames are extracted from the frames of the video. In one implementation, one out of every 10 frames in the video may be extracted. At block 503, for each extracted frame, a set of attributes of the frame is identified. The set for attributes may include color attributes (e.g., RGB intensity values or Y intensity values of each frame), spatial attributes (e.g., Gabor filter feature of each frame), and temporal attributes (e.g., optical flow of each frame).

At block 504, the set of attributes is provided as input to the trained machine learning model. In one implementation, the trained machine learning model is trained using method 400 described with respect to FIG. 4. At block 505, one or more outputs are obtained from the trained machine learning model. In one implementation, the outputs from the trained machine learning model are quality scores corresponding to each extracted frame of the video. The trained machine learning model generates a plurality of quality scores each corresponding to all possible index tuples for video resolution format, transcoding configuration, and display resolution of the input video.

At block 506, the per frame quality scores for the extracted frames of the video are combined to generate an overall quality score for the video. An overall quality score is generated for each of the possible index tuples of video resolution format, transcoding configuration, and display resolution. In one implementation, combining the per frame quality scores includes aggregating the scores. In some implementations, the aggregation process could be varied and can include mean to weighted mean, and so on.

At block 507, a final output of the trained machine learning model is generated, where the final output is a 3D quality matrix for all possible index tuples of video resolution format, transcoding configuration, and display resolution.

Figure 6:
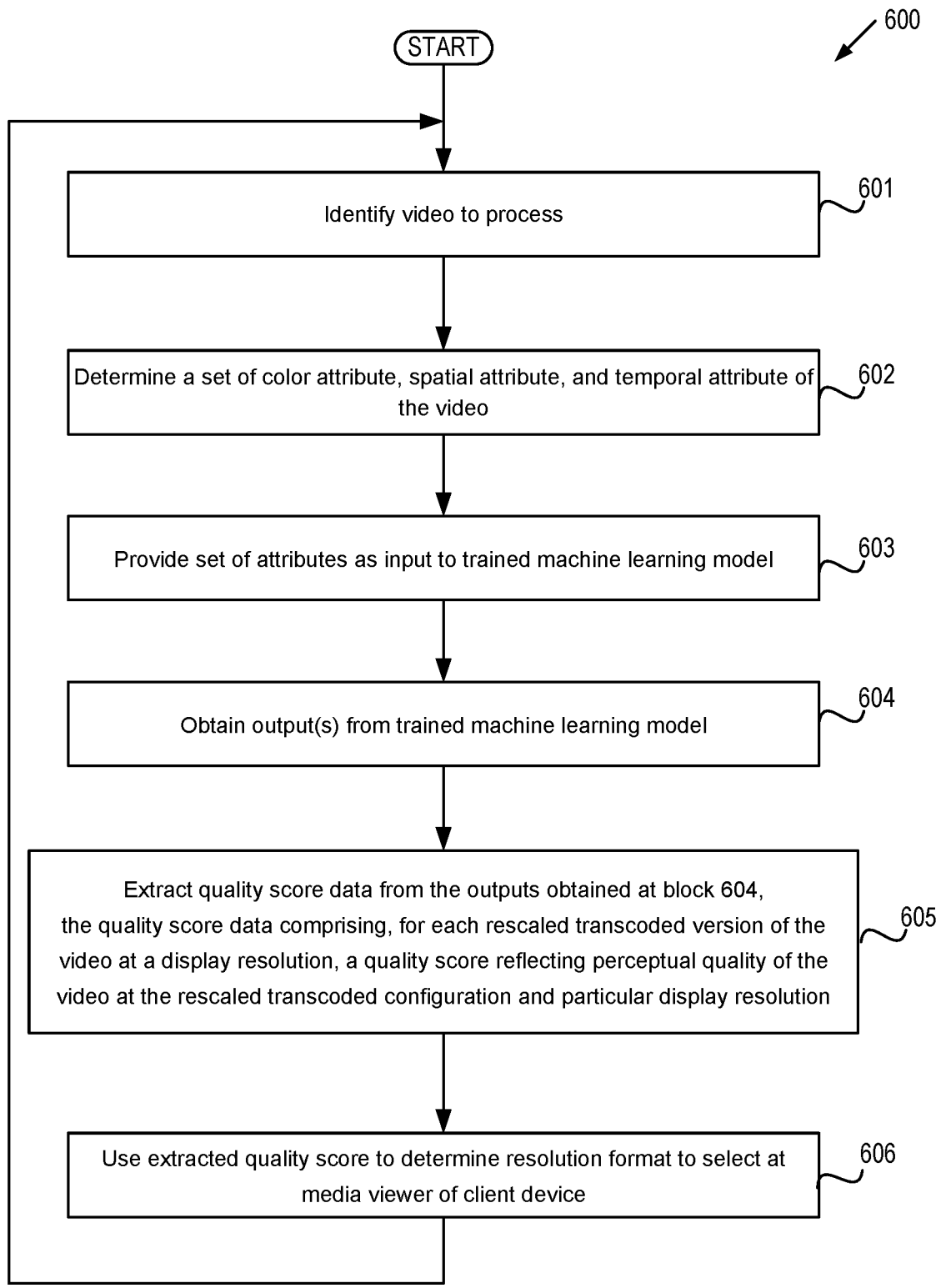
FIG. 6 depicts a flow diagram of one example of a method for processing videos using a trained machine learning model and optimizing format selection using the output of the trained machine learning model at a server device, in accordance with one or more aspects of the disclosure.

FIG. 6 depicts a flow diagram of one example of a method 600 for processing videos using a trained machine learning model and optimizing format selection using the output of the trained machine learning model at a server device, in accordance with one or more aspects of the disclosure. The method is performed by processing logic that may comprise hardware (circuitry, dedicated logic, etc.), software (such as is run on a general purpose computer system or a dedicated machine), or a combination thereof. In one implementation, the method is performed using the server machine 150 and trained machine learning model 160 of FIG. 1, while in some other implementations, one or more blocks of FIG. 6 may be performed by one or more other machines not depicted in the figures.

Method 600 may include receiving an input video (e.g., from a user device or a server such as upload server 125) and processing the input video using a trained model such as trained machine learning model 160. The trained model may be configured to generate, based on pixel data of frames of the input video, one or more outputs indicating a predicted quality score of the input video.

In some implementations, at block 601, a video (input video) may be identified for processing. In one example, the video includes one or more frames of an uploaded video (e.g., a video uploaded to a content sharing platform).

At block 602, a set of attributes of the video is identified. In one implementation, the set of attributes is determined for each of a subset of frames of the video. The set for attributes may include color attributes (e.g., RGB intensity values or Y intensity values of each frame of the video), spatial attributes (e.g., Gabor filter feature of each frame of the video), and temporal attributes (e.g., optical flow of each frame of the video).

At block 603, the set of attributes is provided as input to the trained machine learning model. In one implementation, the trained machine learning model is trained using method 400 described with respect to FIG. 4. At block 604, one or more outputs are obtained from the trained machine learning model. In one implementation, the outputs from the trained machine learning model are quality scores corresponding to each extracted frame of the video. The trained machine learning model generates a plurality of quality scores each corresponding to all possible index tuples for video resolution format, transcoding configuration, and display resolution of the video. In one implementation, the per frame quality scores for the extracted frames of the video are combined to generate an overall quality score for the video. An overall quality score is generated for each of the possible index tuples of video resolution format, transcoding configuration, and display resolution. In one implementation, combining the per frame quality scores includes aggregating the scores. In some implementations, the aggregation process could be varied and can include mean to weighted mean, and so on.

At block 605, quality score data is extracted from the outputs obtained at block 604. In one implementation, the quality score data includes quality scores corresponding to each rescaled transcoded version of the video. The quality scores each reflect a perceptual quality of the video at the respective rescaled transcoded configuration of the video at a particular display resolution. At block 606, the extracted quality score is used to determine a resolution format to select at a media viewer of client device. In one implementation, the format analysis engine 152 (at server machine 150 of FIG. 1 and/or at media viewer 105 of client device 102A) may use the extracted quality score to select a resolution format and transcoding configuration at the client device having a particular display resolution. The format analysis engine 152 may compare the quality score to inform an optimal resolution format and transcoding configuration selection for the client device.

Figure 7:
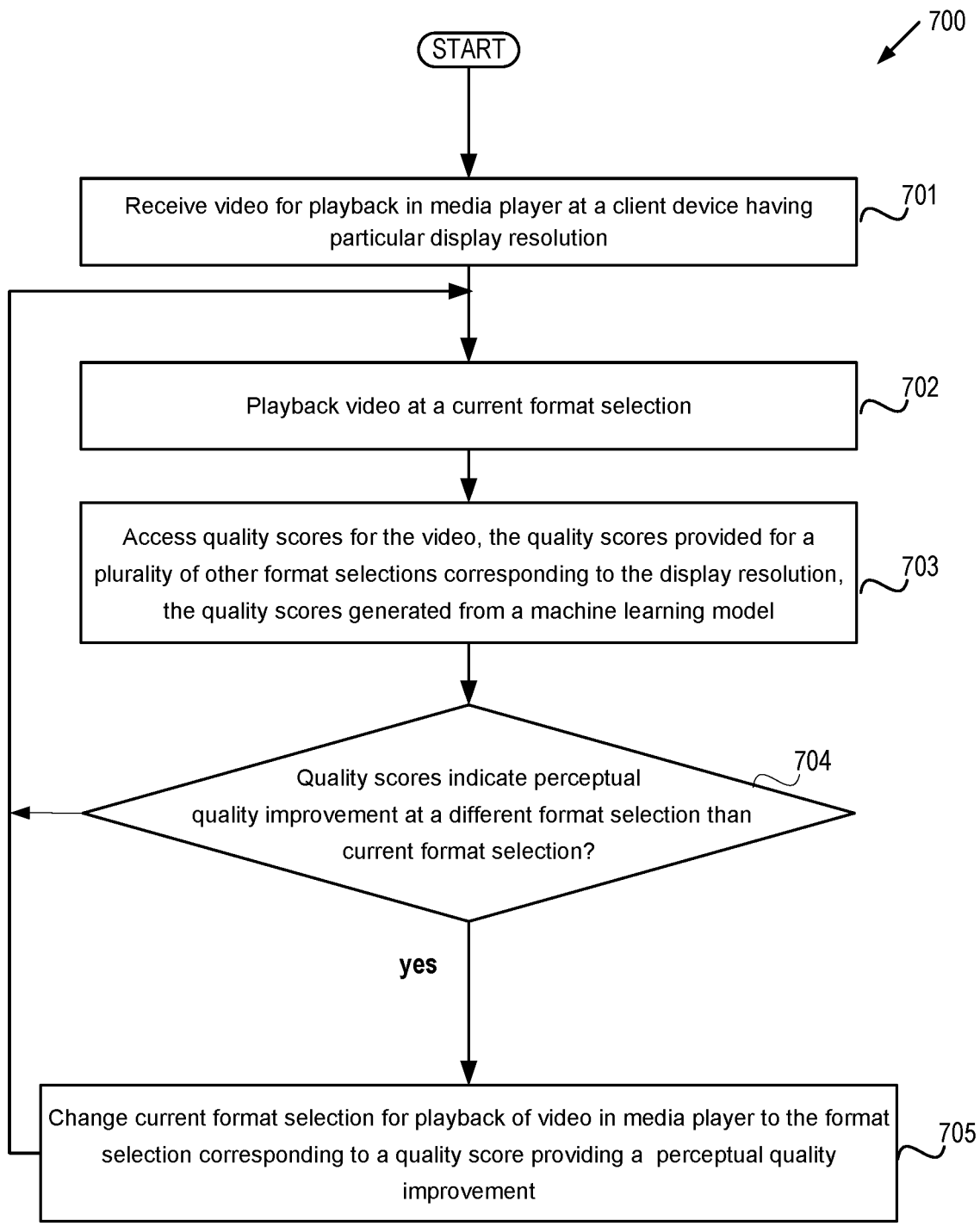
FIG. 7 depicts a flow diagram of one example of a method for optimizing format selection using the output of a trained machine learning model at a client device, in accordance with one or more aspects of the disclosure.

FIG. 7 depicts a flow diagram of one example of a method 700 for optimizing format selection using the output of a trained machine learning model at a client device, in accordance with one or more aspects of the disclosure. The method is performed by processing logic that may comprise hardware (circuitry, dedicated logic, etc.), software (such as is run on a general purpose computer system or a dedicated machine), or a combination thereof. In one implementation, the method is performed using client 102A-102N of FIG. 1, while in some other implementations, one or more blocks of FIG. 7 may be performed by one or more other machines not depicted in the figures.

Method 700 may include receiving, at block 701, an input video (e.g., at a client device 102A-10N from a server such as upload server 125) for playback at a media viewer of the client device, where the client device has a particular display resolution. At block 702, the client device performs playback of the video at a current format selection. The current format selection may include a current video resolution and a current transcoding configuration.

At block 703, quality scores corresponding to the video are accessed. The quality scores are generated using a trained model, such as trained machine learning model 160 of FIG. 1. The trained model may be configured to generate, based on pixel data of frames of the input video, one or more outputs indicating predicted quality scores of the input video at various tuples of video resolutions, transcoding configurations, and display resolution. The outputs may be maintained at the server device (such as server machine 150) or may be provided as metadata with the video when the video is received for playback. In one implementation, the trained machine learning model may be trained according to method 400 of FIG. 4 described above.

At decision block 704, it is determined whether the quality scores indicate a perceptual improvement at a different format selection than the current format selection (e.g., at a different video resolution and/or transcoding configuration) for the particular display resolution of the client device. FIGS. 8A and 8B discussed below provide an example of using quality scores of the trained machine learning model of implementations of the disclosure to optimize format selection at a client device. If the quality scores indicate a perceptual improvement at a different format selection, then method 700 proceeds to block 705, where the current format selection for playback of the video is changed to the format selection (e.g., the video resolution and/or the transcoding configuration) corresponding to the quality score that provides a perceptual quality improvement of the video at the display resolution of the client. Method 700 then returns to block 702 to continue playback of the video at the new format selection. If the quality scores do not indicate a perceptual quality improvement at a different format selection at decision block 704, the method 700 returns to block 702 to continue playback of the video at the current format selection.

FIGS. 8A and 8B provide an example graphical representation of output of the trained machine learning model to optimize format selection, according to implementations of the disclosure. FIGS. 8A and 8B show predicted VMAF scores for a video transcoded into 360p, 480p and 720p versions, and displayed at 480p and 720p, where the various scores predicted by the trained model are very close to the corresponding ground truth scores.

For the example shown in FIG. 8A, the graph shows predicted quality scores (e.g., VMAF) when the display resolution is 480p, and the current version being played is 360p, assuming the bandwidth is sufficient for all transcoded versions. Per predicted quality scores, the perceptual quality of 480p and 720p versions are very close, and both of them are significantly higher than 360p version. In this case, the optimal format is 480p transcoded version, instead of 720p.

In absence of implementations of the disclosure, which provides predicted scores, the media viewer blindly moves up to 720p version, which utilizes more bandwidth, but would not improve the actual watching experience (e.g., perceptual quality) of the video. When the display resolution is 720p (FIG. 8B), since the difference between 480p and 720p is greater than 6 points on VMAF (which roughly translates to 1 step higher in the just noticeable differences), moving up to 720p improves the actual perceptual quality of the video. As such, the media viewer in this case should move up to the 720p version to improve the perceptual quality of the video during playback.

Another advantage of implementations of the disclosure is that it allows precise quality evaluation (CRF level). For example, as shown in FIGS. 8A and 8B, the media viewer can calculate the exact quality improvement on 480p display resolution for switching from 480p CRF 40 version to 720p CRF 30 version, to further optimize the format selection.

Figure 9:
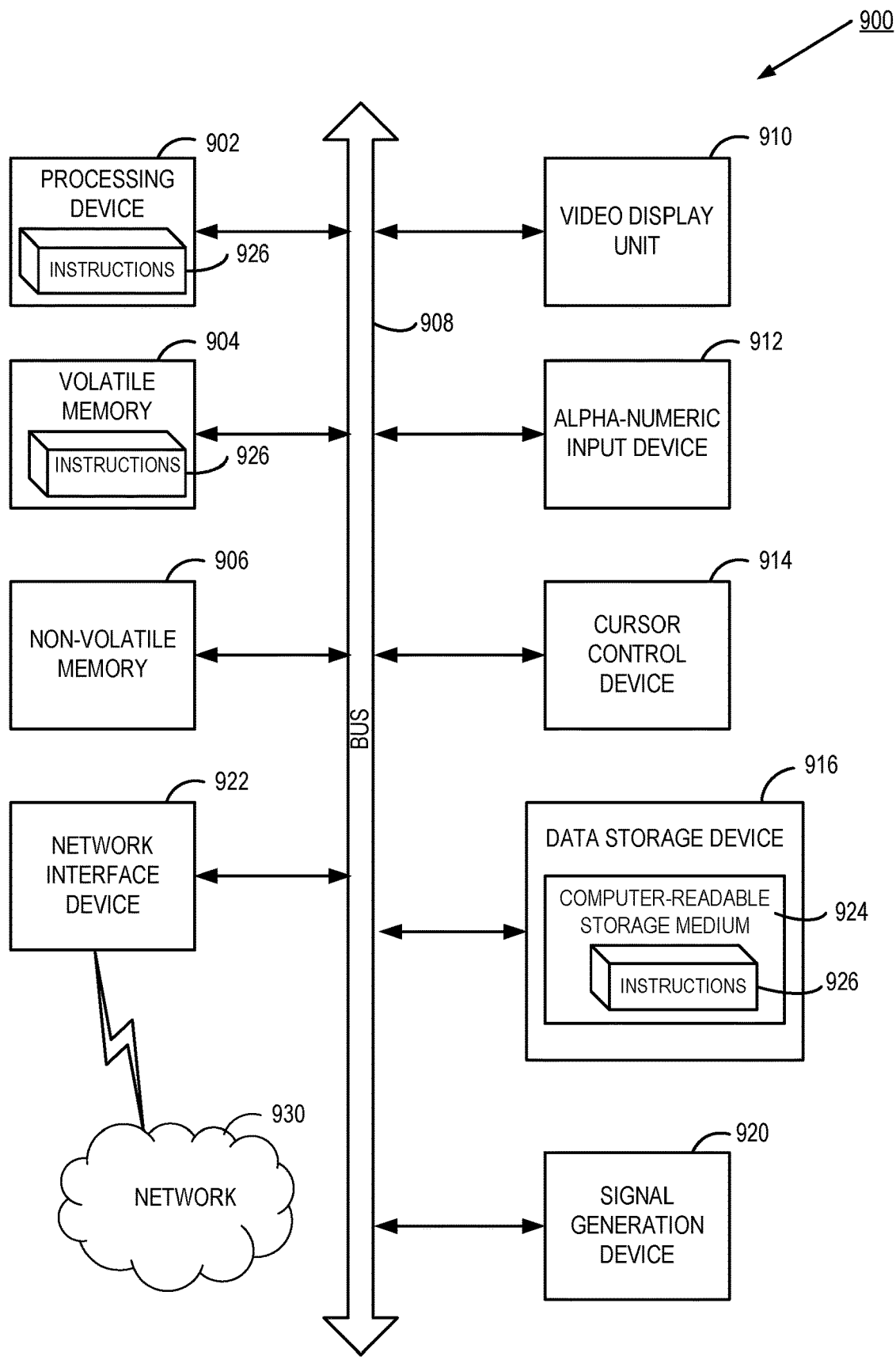
FIG. 9 depicts a block diagram of an illustrative computer system operating in accordance with one or more aspects of the disclosure.

FIG. 9 depicts a block diagram of an illustrative computer system 900 operating in accordance with one or more aspects of the disclosure. In various illustrative examples, computer system 900 may correspond to a computing device within system architecture 100 of FIG. 1. In certain implementations, computer system 900 may be connected (e.g., via a network 630, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alpha-numeric input device 912 (e.g., a keyboard), a cursor control device 914 (e.g., a mouse), and a signal generation device 920.

Data storage device 916 may include a transitory or non-transitory computer-readable storage medium 924 on which may store instructions 926 encoding any one or more of the methods or functions described herein, including instructions for implementing methods 400-700 of FIGS. 4 through 7, respectively.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "generating," "providing," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 through 700 and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
generating training data for a machine learning model to be trained to identify quality scores for a set of transcoded versions of a new video at a set of display resolutions, wherein each display resolution is a resolution at which a transcoded version is displayed after rescaling, and wherein generating the training data comprises:
generating a plurality of reference transcoded versions of a reference video, wherein the plurality of reference transcoded versions comprises the reference video transcoded into a plurality of video resolutions and rescaled to a plurality of display resolutions;
obtaining quality scores for frames of the plurality of reference transcoded versions of the reference video;
generating a first training input comprising a set of color attributes, spatial attributes, and temporal attributes of the frames of the reference video; and
generating a first target output for the first training input, wherein the first target output comprises the quality scores for the frames of the plurality of reference transcoded versions of the reference video; and
providing the training data to train the machine learning model on (i) a set of training inputs comprising the first training input and (ii) a set of target outputs comprising the first target output.

2. The method of claim 1 wherein the quality scores comprise peak signal-to-noise ratio (PSNR) of the frames.

3. The method of claim 1 wherein the quality scores comprise video multimethod assessment fusion (VMAF) of the frames.

4. The method of claim 1 wherein the color attributes comprises at least one of an RGB or Y value of the frames.

5. The method of claim 1 wherein the spatial attributes comprises a Gabor feature filter bank.

6. The method of claim 1 wherein the temporal attributes comprises an optical flow.

7. The method of claim 1 wherein the machine learning model is configured to process the new video and generate one or more outputs indicating a quality score for the set of transcoded versions of the new video at the set of display resolutions.

8. The method of claim 1 wherein the plurality of reference transcoded versions of the reference video further comprise the reference video transcoded into the plurality of video resolutions, with a plurality of transcoding configurations, and rescaled to the plurality of display resolutions.

9. An apparatus comprising:
a memory to store a video; and
a processing device, operatively coupled to the memory, to:
provide sampled frames of the video as input to a trained machine learning model;
obtain one or more outputs from the trained machine learning model; and
extract, from the one or more outputs, a quality score that indicates a perceptual quality of the video transcoded to a first video format, with a first transcoding configuration, and rescaled to a first display resolution.

10. The apparatus of claim 9, wherein the processing device is further to provide the quality score to a client device, the quality score to inform format selection of the video at a media viewer of the client device, wherein the first display resolution is a display resolution of the client device.

11. The apparatus of claim 10 wherein the format selection of the video at the media viewer is based on whether a difference between the quality score and another quality score of the one or more outputs exceeds a threshold value, the another quality score indicating the perceptual quality at a second video format, a second transcoding configuration, and the first display resolution.

12. The apparatus of claim 9 wherein the quality score comprises at least one of a peak signal-to-noise ratio (PSNR) measurement or video multimethod assessment fusion (VMAF) measurement.

13. The apparatus of claim 9 wherein the trained machine learning model is trained with an input-output mapping comprising an input and an output, the input based on a set of color attributes, spatial attributes, and temporal attributes of frames of a reference video, and the output based on quality scores for frames of a plurality of transcoded versions of the reference video.

14. The apparatus of claim 13 wherein the color attributes comprises at least one of RGB or Y value of the frames, the spatial attributes comprises a Gabor feature filter bank of the frames, and the temporal attributes comprise an optical flow of the frames.

15. The apparatus of claim 9 wherein the one or more outputs from the trained machine learning model comprise a plurality of quality scores corresponding to a plurality of possible index tuples of video format, transcoding configuration, and display resolution.

16. A non-transitory machine-readable storage medium storing instructions which, when executed, cause a processing device to perform operations comprising:
generating training data for a machine learning model to be trained to identify quality scores for a set of transcoded versions of a new video at a set of display resolutions, wherein each display resolution is a resolution at which a transcoded version is displayed after rescaling, and wherein generating the training data comprises:
generating a plurality of reference transcoded versions of a reference video, wherein the plurality of reference transcoded versions comprises the reference video transcoded into a plurality of video resolutions and rescaled to a plurality of display resolutions;
obtaining quality scores for frames of the plurality of reference transcoded versions of the reference video;
generating a first training input comprising a set of color attributes, spatial attributes, and temporal attributes of the frames of the reference video; and
generating a first target output for the first training input, wherein the first target output comprises the quality scores for the frames of the plurality of reference transcoded versions of the reference video; and
providing the training data to train the machine learning model on (i) a set of training inputs comprising the first training input and (ii) a set of target outputs comprising the first target output.

17. The non-transitory machine-readable storage medium of claim 16 wherein the quality scores comprise at least one of peak signal-to-noise ratio (PSNR) of the frames or video multimethod assessment fusion (VMAF) of the frames.

18. The non-transitory machine-readable storage medium of claim 16 wherein the color attributes comprises at least one of an RGB or Y value of the frames, and wherein the spatial attributes comprises a Gabor feature filter bank, and wherein the temporal attributes comprises an optical flow.

19. The non-transitory machine-readable storage medium of claim 16 wherein the machine learning model is a convolutional neural network (CNN) training model.

20. The non-transitory machine-readable storage medium of claim 16 wherein the machine learning model is configured to process the new video and to generate one or more outputs indicating a quality score for the set of transcoded versions of the new video at the set of display resolutions.

\* \* \* \* \*